Dec. 21, 1965   O. C. BLOMGREN, SR., ET AL   3,224,485
HEAT CONTROL DEVICE AND METHOD
Filed May 6, 1963
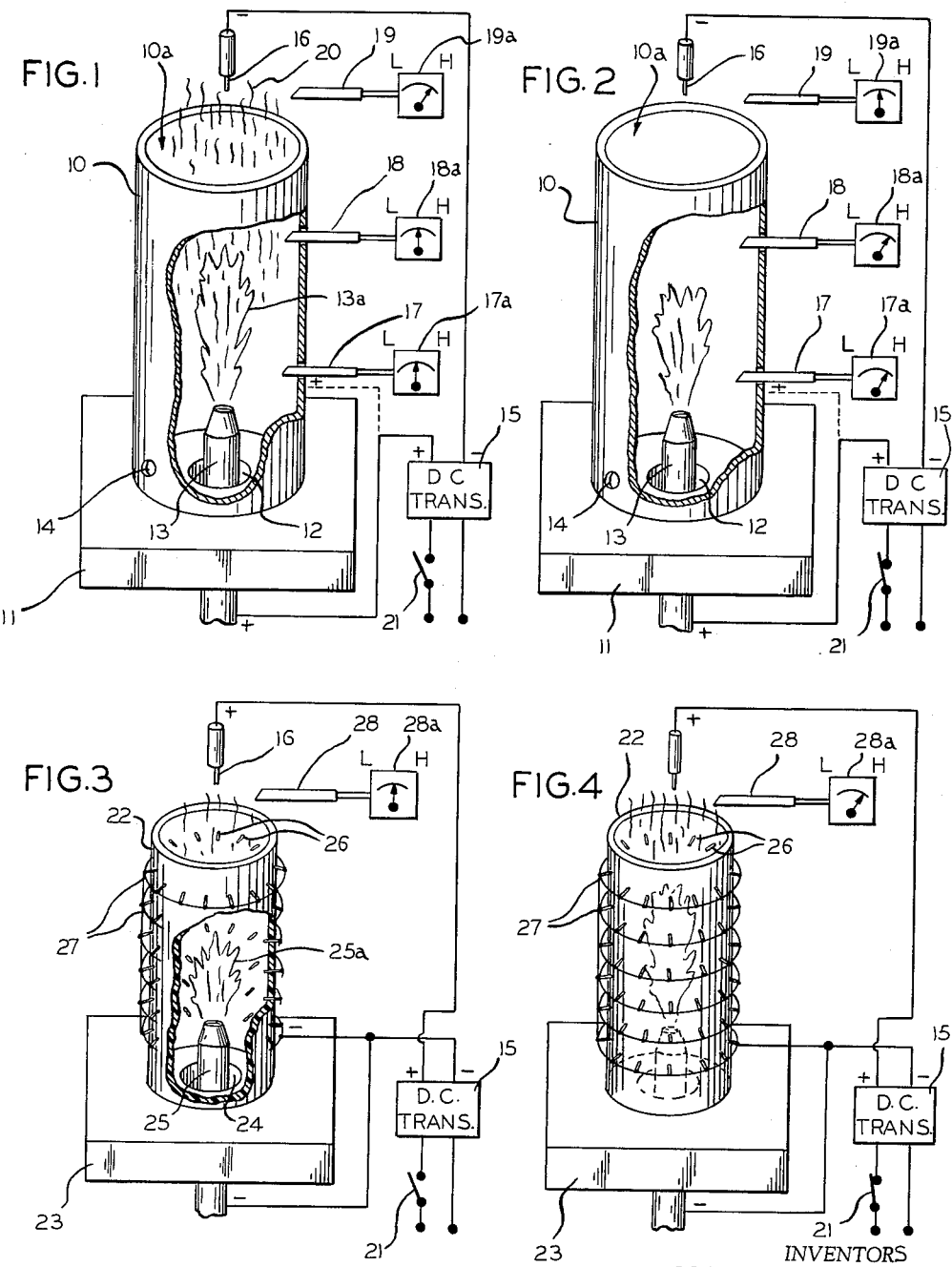
INVENTORS
OSCAR C. BLOMGREN SR.
ELLSWORTH G. MUNCK
SPENCER R. GRIFFITHS JR.
OSCAR C. BLOMGREN JR.
BY *Merrell, Johnston, Cook & Root*
ATTORNEY United States Patent Office 3,224,485
Patented Dec. 21, 1965

3,224,485
HEAT CONTROL DEVICE AND METHOD
Oscar C. Blomgren, Sr., Lake Bluff, Ill., Ellsworth G. Munck, Cleveland, Ohio, and Spencer R. Griffiths, Jr., Park Ridge, and Oscar C. Blomgren, Jr., Lake Bluff, Ill., assignors to Inter-Probe, Inc., North Chicago, Ill., a corporation of Illinois
Filed May 6, 1963, Ser. No. 278,232
8 Claims. (Cl. 158—1)

This invention relates in general to a heat control device and method, and more particularly to a method for controlling the heat energy level or heat level within a tubular member having a heat source therein. Other purposes and uses of the present invention will be apparent to one skilled in the art.

The method of the present invention involves the application of electrical energy by means of electrostatic apparatus for controlling the heat level within a tubular member. A heat source is provided within the tubular member which may be of any desirable type, flame or electrically induced, wherein the heat normally rises or moves in one direction. In the embodiment where the tubular member is vertically arranged, a negatively charged probe is positioned above the open upper end of the tubular member, whereby the action of electrostatic discharge functions to contain substantially all of the heat within the tubular member.

In another embodiment of the invention, a tubular member is provided with a plurality of electrically connected drip points extending through its walls and connected to the negative side of a D.C. transformer. A probe connected to the positive side of the transformer is arranged in spaced relation over the upper open end of the tubular member, whereby electrostatic discharge serves to maintain the walls of the tubular member in a cool condition.

It is therefore an object of this invention to provide a method of controlling the heat level within a tubular member.

Another object of this invention is in the provision of a method of controlling the heat level within a tubular member having a heat source therein, wherein the open end of the tubular member is subjected to an electrostatic discharge.

Still another object of this invention resides in the provision of a method for increasing the energy level within a tubular member having a heat source therein by directing a negatively charged probe downwardly at the upper open end of the member for subjecting the upper open end to the action of electrostatic discharge.

A further object of this invention is to provide a method of decreasing the temperature level of the interior wall surfaces of a tubular member having a heat source therein by negatively charging the tubular member and positively charging a probe directed downwardly at the upper open end of the member for subjecting the walls of the member to electrostatic discharge.

A further object of this invention is in the provision of an apparatus for controlling the heat level within the tubular member.

A still further object of this invention resides in the application of the method of the present invention to produce a furnace that includes a tubular member having a high heat source therein, and electrostatic discharge means for containing the heat within the tubular member.

Other objects, features and advantages of the invention will be apparent from the following detailed disclosure, taken in conjunction with the accompanying sheet of drawing, wherein like reference numerals refer to like parts, in which:

FIGS. 1 and 2 illustrate diagrammatically the method of the present invention as applied to a tubular member and wherein the temperature level within the tubular member is elevated by application of the invention; and FIGS. 3 and 4 are diagrammatic illustrations of application of the present invention to a tubular member for the purpose of decreasing the inner wall temperature that is being subjected to a heat source.

Referring now to the drawings, and particularly to the diagrammatic showing of FIGS. 1 and 2, a tubular member 10 is freely mounted on a block of insulating material 11 having a hole 12 extending therethrough for receiving a torch 13. The torch 13 emits a flame 13a projecting upwardly through the tubular member 10 and which normally causes heat to escape through the upper open end 10a of the tubular member. One or more air vents 14 may be provided at the base of the tubular member for facilitating the combustion of the gases from the torch 13.

A D.C. transformer 15, capable of producing a high voltage, low amperage, continuous current has its negative side connected to a probe 16 and its positive side or ground connected to the torch 13. Alternatively, the positive side of the transformer may be additionally connected to the tubular member 10 as shown in dotted lines, or to the tubular member alone. The probe 16 is arranged to project downwardly through the upper open end of the tubular member 10, and is spaced therefrom out of arcing or shorting range. Preferably, the probe 16 comprises a sharply pointed, needle-like member. The tubular member 10 is constructed of an electrically conductive material, but may be of any other desired material. Further, the tubular member 10 may have any desired cross-section.

As shown in FIG. 1, a plurality of thermocouples 17, 18 and 19 are provided to detect the energy or heat level at specific locations within the tubular member and above the tubular member. Particularly, the thermocouple 17 measures the temperature within the tubular member 10 at a point slightly above the nozzle end of the torch 13. The thermocouple 18 measures the temperature within the tubular member 10 at a point directly above the point measured by the thermocouple 17 and at a point approximately level with the free end of the flame 13a. Finally, the thermocouple 19 is arranged to measure the temperature of heat level at the upper open end of the tubular member 10. As seen in FIG. 1, with the torch 13 energized, considerable heat rises through the upper open end 10a of the tubular member and is illustrated by the wavy lines 20.

For purposes of illustration, a main switch 21 is provided in the power supply leading to the transformer 15, and when closed, will energize the transformer to subject the upper open end of the tubular member 10 to electrostatic discharge. The action of the electrostatic discharge causes a substantial increase in temperature as measured by the thermocouples 17 and 18 which are positioned to measure the temperature within the tubular member, while a substantial decrease in temperature is measured by the thermocouple 19 which is positioned above the upper open end of the tubular member to measure the heat being discharged through the upper open end 10a thereof. The meters 17a, 18a and 19a for the thermocouples 17, 18 and 19, respectively, show the relative temperature levels in FIG. 1 where the transformer is not energized, and in FIG. 2 where the transformer is energized to subject the upper end of the tubular member to electrostatic action.

It should be appreciated that the action of the probe 16 may be accomplished even where the positive side of the transformer 15 is not connected to the torch 13. Further, it may be appreciated that the device as set up in FIGS. 1 and 2 and as operating in FIG. 2 constitutes a furnace having greater efficiency by containment of substantially all heat generated by the torch 13 or other suitable heating element within the tubular member 10. Other means of raising the energy level within the tubular member may be employed, such as an electrical heating element.

Another illustration of the invention is shown in FIGS. 3 and 4 wherein it is desired to maintain the walls of a tubular member at a relatively cool temperature where a source of heat energy is arranged within the walls. Particularly a tubular member 22 of insulating material such as Teflon or the like is placed on a block of insulating material 23 having an opening 24 therein through which projects a torch 25. Thus, a flame 25a is emitted from the torch 25 to provide a heat source within the tubular member 22. A plurality of drip points or needles 26 are mounted in the tubular member 22 and project radially inwardly from the inner surface of the member. Suitable wiring 27 is provided to electrically connect the drip points 26.

In applying the present invention in this illustration, the transformer 15 has its negative side connected to the torch 25 and the drip points 26, while its positive side or ground is connected to the probe 16. Again the probe is positioned above the upper open end of the tubular member 22 a distance just out of arcing or shorting range.

A thermocouple 28 having a meter 28a is arranged above the upper open end of the tubular member 22 to measure the temperature level at the open end which is created by the flame induced heat within the Teflon tubular member 22.

Upon closing of the main switch 21 to energize the transformer 15, the interior walls of the tubular member 22 are subjected to electrostatic action that causes a cooling of the walls of the tubular member, and an increase in heat level above the open end of the tubular member as measured by the thermocouple 28. The heat generated by the flame has no effect on the Teflon tubular member, even after several hours of operation in connection with the invention. Accordingly, application of the invention where connection of the proble 16 to the positive side of the transformer and connection of the drip points 26 to the negative side is made, increases the temperature level at the upper open end of the tubular member 22 and decreases the inside wall temperature of the tubular member.

It will be understood that modifications and variations may be effected without departing from the scope of the novel concepts of the present invention, but it is understood that this application is to be limited only by the scope of the appended claims.

The invention is hereby claimed as follows:

1. The method of decreasing the temperature at the upper open end of an upstanding tubular member having a heat source therein and wherein the heat therefrom normally moves in one direction toward said open end, comprising the steps of directing a needle-like probe downwardly towards the said upper open end of the tubular member, negatively charging said probe with a high voltage, low amperage source to thereby substantially retard movement of the heat out the upper open end of said member, and spacing said probe at a distance from the upper open end of said member slightly greater than that which would cause arcing between said probe and said member.

2. The method of decreasing the temperature at the upper open end of an upstanding electrically conductive tubular member having a high heat source and wherein the heat therefrom normally moves in one direction toward said open end, therein comprising the steps of directing a needle-like probe downwardly towards the upper end of the tubular member, negatively charging said probe and positively charging said member with a high voltage, low amperage source to thereby substantially retard movement of the heat out the upper open end of said member, and spacing said probe at a distance from the upper open end of said member slightly greater than that which would cause arcing between said probe and said member.

3. The method of increasing the temperature at the upper open end of an upstanding non-conductive tubular member having a high heat source therein and a plurality of electrically connected drip points terminating within the member comprising the steps of negatively charging said drip points, and directing a positively charged probe downwardly towards the upper end of the member to thereby subject the upper open end of said member to the action of an electrostatic discharge in a force field of unidirectional character.

4. The method of decreasing the wall temperature within an upstanding tubular member having a high heat source therein and a plurality of electrically connected drip points arranged along the inner walls of said member comprising the steps of negatively charging said drip points and directing a positively charged probe downwardly toward the upper open end of said member to thereby subject the inner walls of said member to a continuous electrostatic discharge.

5. In combination with an upstanding tubular member having a high heat source therein to cause the heat therefrom to move in one direction toward the upper end of the member, apparatus for increasing the temperature within said member comprising, high voltage low current means having a negative side, a needle-like probe spaced from the upper open end of said member, means for connecting said probe to the negative side of said voltage means to thereby substantially retard the movement of the heat out the upper open end of said member, said spaced probe being at a distance from the upper open end of said member slightly greater than that which would cause arcing between said probe and said member.

6. A furnace comprising, an upstanding electrically conductive tubular member, a heat source within said member, said heat source causing the heat therefrom to normally move in one direction toward the upper open end of said member, high voltage low current means having a negative and a positive side, means for connecting the positive side of said voltage means to said member, a needle-like probe spaced from and projecting downwardly toward the upper open end of said member, means for connecting said probe to the negative side of said voltage means to thereby substantially retard movement of the heat out the upper open end of said member, and said probe being spaced at a distance from said member slightly greater than that which would cause arcing between said probe and said member.

7. The method of decreasing the temperature at the open end of a tubular member having a heat source therein and wherein the heat therefrom normally moves in one direction toward said open end, comprising the steps of directing a needle-like probe towards said open end of the tubular member, negatively charging said probe with a high voltage, low amperage source to thereby substantially retard movement of the heat out the open end of said member, and spacing said probe at a distance from said member slightly greater than that which would cause arcing between said probe and said member.

8. The method of decreasing the wall temperature within a tubular member having a high heat source therein and a plurality of electrically connected drip points arranged along the inner walls of said member comprising the steps of negatively charging said drip points and directing a positively charged probe toward one open end of said member to thereby subject the inner walls of said member to a continuous electrostatic discharge.

References Cited by the Examiner

UNITED STATES PATENTS 2,604,936   7/1952   Kaehni et al. _____ 158–113
2,605,377   7/1959   Kaehni et al. _____ 165—1 X

OTHER REFERENCES

Publication: "New or Unusual Burners and Combustion Processes" (Griffiths), Research Bulletin 96, Published by American Gas Association Laboratories, 8/63 (pp. 36—41 relied on).

FREDERICK L. MATTESON, Jr., *Primary Examiner.*

MEYER PERLIN, JAMES W. WESTHAVER,

*Examiners.*